E. W. KAMMER.
MANGER GUARD FOR CALVES AND OTHER ANIMALS.
APPLICATION FILED JUNE 12, 1916.
1,276,541.
Patented Aug. 20, 1918.
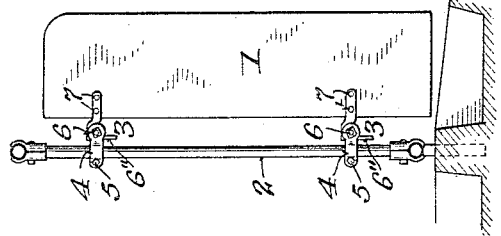
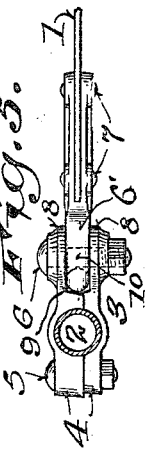
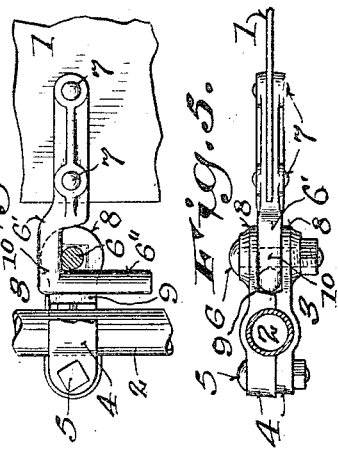
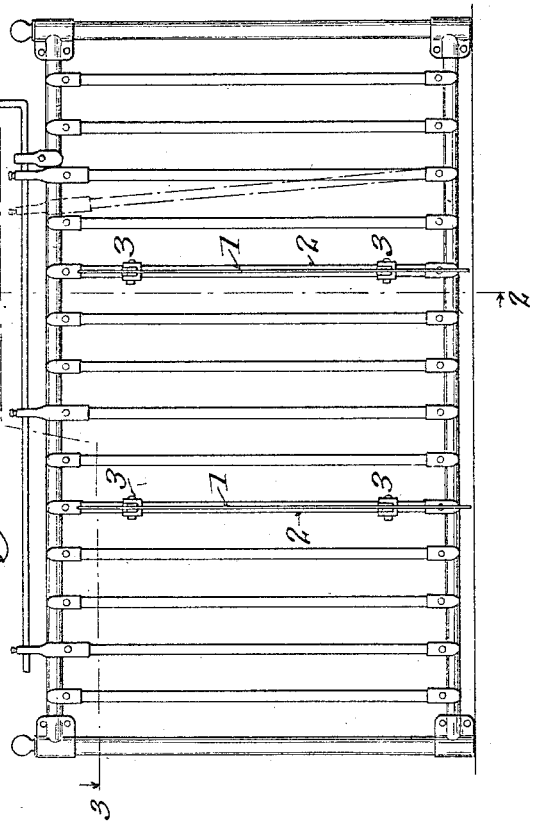
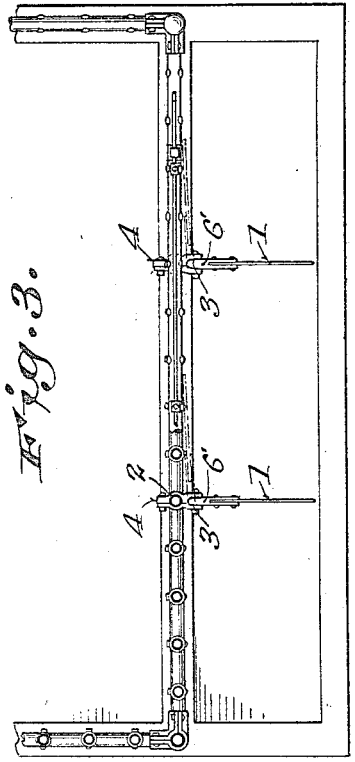
Inventor
Edgar W. Kammer
By Erwin & Wheeler
Attorneys

UNITED STATES PATENT OFFICE.

EDGAR W. KAMMER, OF FORT ATKINSON, WISCONSIN, ASSIGNOR TO JAMES MANUFACTURING COMPANY, OF FORT ATKINSON, WISCONSIN, A CORPORATION OF WISCONSIN.

MANGER-GUARD FOR CALVES AND OTHER ANIMALS.

1,276,541.　　　　　　　　Specification of Letters Patent.　　Patented Aug. 20, 1918.

Application filed June 12, 1916.　Serial No. 103,077.

*To all whom it may concern:*

Be it known that I, EDGAR W. KAMMER, a citizen of the United States, residing at the city of Fort Atkinson, county of Jefferson, and State of Wisconsin, have invented new and useful Improvements in Manger-Guards for Calves and other Animals, of which the following is a specification.

My invention relates to improvements in manger guards for calves and other animals.

The object of my invention is to provide means whereby the space above a manger may be subdivided between adjacent stanchions in such a manner as to allow free access to the manger without permitting the heads of the animals to strike or contact with those of adjacent animals. My invention is designed particularly for use in connection with calf stalls, to prevent calves from sucking the ears of adjacent calves. A further object of my invention is to provide means to facilitate the removal and replacement of the guards, whereby free access to the manger is allowed, when it is desired to clean the same, or remove the contents, regard being had for sanitation, simplicity, economy in cost of production and durability.

More specifically stated, my object is to provide means whereby a removable manger guard may be supported in either an extended or in a folded position independently of the manger, whereby the walls of the manger may be left free of recesses or projections and may therefore be easily kept in a perfectly sanitary condition, the walls of the manger and the space above the manger being entirely unobstructed from one end to the other when the guards are folded or removed.

My invention is explained by reference to the accompanying drawing, in which—

Figure 1 represents a front view thereof in connection with a plurality of stanchions.

Fig. 2 is a side view of one of my devices, drawn on line 2—2 of Fig. 1.

Fig. 3 is a plan view drawn on line 3—3 of Fig. 1.

Fig. 4 is an end view, and

Fig. 5 is a plan view of one of the partition supporting hinges, two similar hinges being preferably used, one of such hinges being connected with each end of the partition, as more clearly shown in Fig. 2.

Like parts are identified by the same reference characters throughout the several views.

Each of the guards 1 is preferably formed of sheet metal and supported near its respective ends from one of the vertical standards 2 of the stanchion supporting frame of a calf pen or other inclosure by a plurality of supporting brackets, each bracket comprising a pair of members 4, clamped to the standard by a set of clamping bolts 5 and 6, and spaced apart at their front ends through which the bolt 6 passes. Each guard 1 is provided with a pair of rearwardly projecting arms 6′ provided at their rear ends with vertical hinge pins 6″ adapted to pass downwardly in the space 9 between the separated front end portions 8 of bracket members 4. The rear ends of the arms 6′ are also received between the front ends of the bracket members 4 and bear upon the clamping bolts 6. The portions 10 of the arms 6′ which thus bear upon the bolts 6, are preferably offset upwardly, and the bolts 6 are therefore each received in a recess, the three sides of which are formed by the arm 6′ proper, the upwardly offset portion 10 and the downwardly projecting pin 6″.

The guards will therefore be securely supported above the manger, in planes transverse thereto, but by lifting any one of the guards until the portions 10 of its supporting arms are raised above the portions 8 of the clamping brackets, the guards may be swung to a folded position, as indicated by dotted lines in Fig. 3. The bracket portions 8 are preferably circular, or otherwise widened vertically, so that they hold the guards in the folded as well as the extended positions. The guards may be readily removed when not in use, or for the purpose of washing them, by merely lifting them far enough to wholly withdraw the pins 6″. The latter are of sufficient length to prevent accidental disengagement. In one sense, the arms 6′ and pins 6″ taken with the brackets, may be regarded as constituting a hinge connection between the guard and the standard, but it will be observed that the functions of a hinge can only be performed when the guards are lifted, to disengage the portions 10 without disengaging the pins 6″.

Having thus described my invention what I claim as new and desire to secure by Letters Patent, is—

1. In a device of the described class, the combination with an inclosure for calves, of a plurality of stanchions, a manger, a horizontally swinging partition guard located between each pair of stanchions and projecting over the manger, a vertical standard located in rear of each partition, a pair of supporting brackets connected to said standard and provided with pin receiving sockets, and arms connected with said guards and adapted to engage in said sockets, said brackets being adapted to allow said guards to swing when lifted from normal position and to hold them against swinging movements when in normal position, whereby said guards may be held in either position independently of the manger walls and said walls being smooth and unobstructed throughout their length.

2. The combination with an inclosure for calves, of a plurality of stanchions, a manger, a guard located between each pair of stanchions and projecting above the manger, a vertical standard located in rear of each guard, a pair of hinges connecting said guard at its respective ends to said standard, each of said hinges comprising a pair of clamping members, a pair of bolts for securing said clamping members to said vertical standard, and a pair of hinge members for pivotally connecting said partitions to said clamping members; said hinge members, when in normal position, being socketed between the extremities of the clamping members and held against swinging movements.

3. The combination with an inclosure for calves, of a plurality of stanchions, a manger, a guard located between each pair of stanchions and projecting above the manger, a vertical standard located in rear of each guard, a set of supporting members connecting said guard at its respective ends to said standard, each of said supporting members comprising a bracket secured to said standard, and provided with forwardly projecting arms, a bolt connecting said arms, an arm carried by the guard and adapted to be received between said bracket arms, and a vertically depending pin adapted to pass between the bracket arms back of said bolt.

In testimony whereof I affix my signature in the presence of two witnesses.

EDGAR W. KAMMER.

Witnesses:
JOHN B. OLSON,
JOHN G. SHODRON.

Copies of this patent may be obtained for five cents each, by addressing the "Commissioner of Patents, Washington, D. C."